United States Patent
Li et al.

(10) Patent No.: US 8,972,999 B2
(45) Date of Patent: *Mar. 3, 2015

(54) METHOD AND SYSTEM FOR DETECTING PROGRAM DEADLOCK

(71) Applicant: International Business Machines Corporation, Armonk, NY (US)

(72) Inventors: Wei Li, Beijing (CN); Zhi Da Luo, Beijing (CN); Yao Qi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/915,201

(22) Filed: Jun. 11, 2013

(65) Prior Publication Data

US 2013/0275982 A1    Oct. 17, 2013

Related U.S. Application Data

(63) Continuation of application No. 13/082,618, filed on Apr. 8, 2011, now Pat. No. 8,490,095.

(30) Foreign Application Priority Data

Apr. 16, 2010    (CN) .......................... 2010 1 0150075

(51) Int. Cl.
*G06F 9/46* (2006.01)
*G06F 9/52* (2006.01)
(52) U.S. Cl.
CPC ...................................... *G06F 9/524* (2013.01)
USPC ........................................................ 718/100
(58) Field of Classification Search
None
See application file for complete search history.

(56) References Cited

U.S. PATENT DOCUMENTS

2007/0150897 A1    6/2007 Leeman, Jr.
2007/0156939 A1    7/2007 Farchi et al.

OTHER PUBLICATIONS

Daniel John Debrunner Internals of Derby, An Open Source Pure Java Relational Database Engine, Sep. 20, 2004.
Ali Dasdan, Faster Maximum and Minimum Mean Cycle Algorithms for System Performance Analysis, Feb. 1997.
Rutar, Nick; A Comparison of Bug Finding Tools for Java; International Symopsium on Software Reliability Engineering; 2004.
Eugster, Pascal; Java Virtual Machine with Rollback Procedure allowing Systematic and Exhaustive Testing of Multi-threaded Java Programs; Formal Methods Group; Mar. 31, 2003.
Ron Seybold; HP provides IMAGE deadlock detection in PowerPatch 6; http://www.3000newswire.com/subscribers/DeadlockBrief-9907.html; Jul. 1999.

*Primary Examiner* — Gregory A Kessler
(74) *Attorney, Agent, or Firm* — Parashos T. Kalaitzis; Robert C. Rolnik

(57) ABSTRACT

The present invention relates to a technology for deadlock detection in a program, and more particularly relates to a technology for detecting deadlock in a program through lock graph analysis. The present invention provides a method for detecting deadlock, comprising: obtaining lock information related to locking operation in a program; generating a first lock graph based on the obtained lock information, wherein each node in the first lock graph comprises a set of locks comprising at least one lock and a set of program locations comprising at least one lock location; extracting a strongly connected sub graph in the first lock graph; unfolding the strongly connected sub graph in the first lock graph to generate a second lock graph, wherein each node in the second lock graph comprises a single lock; and extracting a strongly connected sub graph in the second lock graph, the strongly connected sub graph in the second lock graph indicating a deadlock in the program.

9 Claims, 10 Drawing Sheets

METHOD AND SYSTEM FOR DETECTING PROGRAM DEADLOCK

BACKGROUND

This application claims benefit of priority of Foreign Patent Application No. 201010150075.X, filed in China on Apr. 16, 2010, which is herein incorporated by reference.

The present invention relates to a technology for deadlock detection in a program and more particularly relates to a technology for detecting deadlock in a program through lock graph analysis.

Process (thread) deadlock in a computer program is a very fatal problem. Process (thread) deadlock refers to a phenomenon where two or more processes (threads) are waiting for each other, which is caused by the two or more processes (threads) competing on a shared resource during execution. Unless a process (thread) to which deadlock occurs abandons the shared resource, two or more transactions in the deadlock have to wait indefinitely. The process (thread) deadlock will usually cause breakdown of the whole system. Many factors exist triggering process (thread) deadlock, mainly comprising (1) limited system resources, (2) an improper sequence for executing processes (threads), and (3) improper resource allocation. If the system resources are sufficient and all process requests for resources can be satisfied, the possibility of deadlock will be low; otherwise, striving for the limited resources will result into deadlock. Furthermore, differences in process running and advancing sequence and speed may also cause deadlock. In order to prevent process (thread) deadlock from causing serious damage to the whole system and to improve system stability, an efficient method for detecting deadlock is desirable so as to find process (thread) deadlock in time and adopt proper measures to release deadlock, thereby avoiding further deterioration of the system running condition.

Currently, the prior art has proposed a graph theory based deadlock detection method. A graph intuitively representing a deadlock state is constructed by recording lock events during the execution of a computer program, for example, lock graph and resource allocation graph. In a lock graph, a node denotes a lock of resources, and a directed edge pointing from one node to another node indicates that a process having obtained a lock of a certain resource is requesting a lock of another resource. Specifically speaking, a directed edge indicates that a process having obtained a lock of a certain resource at a particular program location (for example, lines of program codes) will obtain a lock of another resource at a next particular program location. If directed edges between two or more nodes in the graph form a closed directed loop, or the graph has a strongly connected sub graph, it indicates that the program has deadlock, and thus deadlock may be detected by checking whether a directed loop exists in the graph. The concept of strongly connected sub graph will be introduced hereinafter.

The above graph theory based deadlock detection method in the prior art has the following problems: currently, the code quantity for many large programs is bulky, and the processes (threads) involved during program running are great, and accordingly, the quantity of the requirements on resources (locks) by the processes (threads) is also very large. In this case, the quantity of nodes (locks) of the generated lock graph will be very great, so is the quantity of directed edges (a process having obtained a lock of a certain resource is requesting a lock of another resource). Therefore, generation of the lock graph will waste a great amount of time and system resources; meanwhile, the work of retrieving or extracting a strongly connected sub graph or closed loop from the generated complicated lock graph will also consume a great amount of time and system resources. In other words, to detect a currently popular large program with the graph theory based deadlock detection method in the prior art is extremely time consuming, resource consuming, and rather uneconomic.

BRIEF SUMMARY

In view of the above problems, one of the objectives of the present invention is to provide a system and method for detecting deadlock that may simplify deadlock graph generation. Another objective of the present invention is to provide a method and system capable of reducing time consumption and saving resource consumption during a deadlock detection process. An idea of the present invention is mainly based on the following consideration: since the quantity of nodes and the quantity of directed edges in a lock graph are very great because of the large quantity of codes of the current large program and the large quantity of involved processes (threads), the inventors consider changing the generation manner of a lock graph node in the prior art so as to merge one or more locks and one or more particular program locations (for example, lines of program codes) into one node, thereby reducing the quantity of nodes and directed edges in the lock graph and then detecting or extracting a closed loop (strongly connected sub graph) therein in a manner of wasting less time and fewer system resources based on the simplified lock graph. Therefore, in view of the above consideration, the present invention divides a deadlock detection process into two phases, where besides the above first phase of generating a simplified lock graph and detecting a strongly connected sub graph therein, there is a phase of further unfolding the extracted strongly connected sub graph into a lock graph of the second phase and finally determining deadlock information in the program by detecting a closed loop (strongly connected sub graph) in the lock graph of the second phase. The above two considerations supplement each other. That is, by performing deadlock detection in two phases, the initially generated lock graph can be simplified and the process of detecting a closed loop (strongly connected sub graph) in the lock graph also simplified.

According to an aspect of the present invention, there is provided a method for detecting deadlock, comprising: obtaining lock information related to locking operations in a program; generating a first lock graph based on the obtained lock information, wherein each node in the first lock graph comprises a set of locks comprising at least one lock and a set of program locations comprising at least one program location; extracting a strongly connected sub graph in the first lock graph; unfolding the strongly connected sub graph in the first lock graph to generate a second lock graph, wherein each node in the second lock graph comprises a single lock; and extracting a strongly connected sub graph in the second lock graph, the strongly connected sub graph in the second lock graph indicating deadlock in the program.

According to an embodiment of the present invention, the method further comprises: determining whether a lock indicated by information on locking operation in the obtained lock information and a program location corresponding to the lock have been recorded in a reserved node in the first lock graph.

According to another aspect of the present invention, there is provided a system for detecting deadlock, comprising lock information obtaining means for obtaining lock information related to locking operations in a program; first lock graph generating means for generating a first lock graph based on the obtained lock information, wherein each node in the first lock graph comprises a set of locks comprising at least one lock and a set of program locations comprising at least one program location; first strongly connected sub graph extracting means for extracting a strongly connected sub graph in the first lock graph; second lock graph generating means for unfolding the strongly connected sub graph in the first lock graph to generate a second lock graph, wherein each node in the second lock graph comprises a single lock; and second strongly connected sub graph extracting means for extracting a strongly connected sub graph in the second lock graph, the strongly connected sub graph in the second lock graph indicating a deadlock in the program.

By using the method and system according to the present invention, it is possible to achieve technical effects of reducing time consumption and saving resources during a deadlock detection system.

BRIEF DESCRIPTION OF THE SEVERAL VIEWS OF THE DRAWINGS

The above and other features of the present invention will become more apparent through detailed description of the embodiments as illustrated with reference to the accompanying drawings. In the accompanying drawings of the present invention, like reference signs indicate like or similar components. In the drawings.

FIGS. 4A to 4I illustrates exemplary diagrams of performing deadlock detection according to an embodiment of the present invention;

DETAILED DESCRIPTION

Hereinafter, a method and a system for determining a node to be materialized according to the present invention will be described in detail through preferred embodiments with reference to the drawings.

Figure 1:
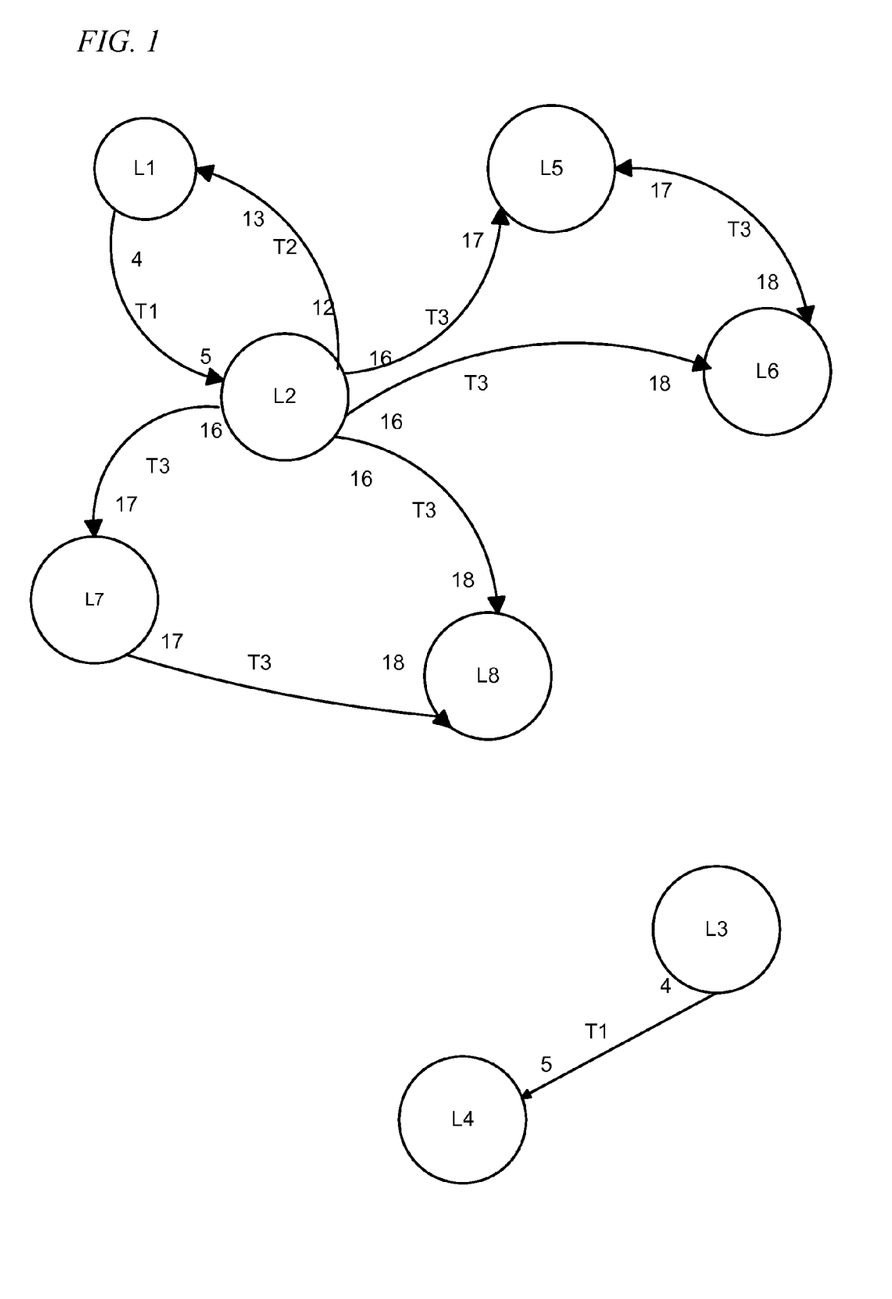
FIG. 1 illustrates an exemplary diagram of a graph theory based deadlock detection method in the prior art.

FIG. 1 illustrates an exemplary diagram (lock graph) of a graph theory based deadlock detection method in the prior art. Suppose the following nine pieces of lock information are stored in a log file generated after a program runs for once. First, it is necessary to briefly introduce meanings of the lock information and possible expression forms. Specifically, the lock information may be in the following form: T1:12(L1)15 (L4), 7(L8)26(L3). The meaning of this expression is: for thread T1, it is subjected to L1 lock in line 12 of the program code, and it is required to be subjected to L4 lock in line 15 of the program; the thread T1 is also subjected to L8 lock in line 7 of the program code, and it is required to be subjected to L3 lock in line 26 of the program code, wherein T1 indicates a particular thread (process), 12, 15, 7, and 26 indicate particular locations (lines of program codes), and L1, L4, L8, and L3 indicate names or symbols of the locks.

Suppose the 9 pieces of lock information are (1)T1:4L15L2; (2)T3:16L217L5; (3)T1:4L35L4; (4) T3:16L218L8; (5)T3:16L217L7; (6)T3:17L718L8; (7)T3:17L518L6; (8) T2:12L213L1; and (9)T3:16L218L6, respectively, wherein (3)T1:4L35L4 is shown at FIG. 1. Then, with the graph theory based deadlock detection method in the prior art, each lock is taken as a node, and information of locking a particular thread on a particular program location (locking operation information) as recorded in each piece of lock information is taken as a directed edge, and the lock graph as illustrated in FIG. 1 is thereby generated. For example, "4, T1, 5" are marked in sequence on the directed edge pointing from node L1 to node L2, which indicate that the thread T1 is subjected to lock L1 in line 4 of the program, and it is required to be subjected to lock L2 in line 5. This corresponds to the content of the above lock information (1), and so forth. From the lock graph as illustrated in FIG. 1, there are 8 nodes are included in the lock graph (each lock is a node). Next, those skilled in the art may understand, by retrieving a strongly connected sub graph (closed loop) therein with the lock graph as illustrated in FIG. 1, a deadlock existing in a program may be detected. Apparently, the lock graph as illustrated in FIG. 1 has a closed loop (strongly connected sub graph) composed of nodes L1 and L2, the closed loop-indicating deadlock in the program.

Its should be noted that it is only for convenience of illustration to provide 9 pieces of lock information and only 8 locks in the example of FIG. 1. Actually, in a current large program, lock information in a program log file is far greater than this order of magnitude, and the number of existing locks is also far greater than this order of magnitude. This will make generation of the lock graph as illustrated in FIG. 1 become exceptionally complicated, and it will also become exceptionally complicated, time-consuming, and resource consuming to detect all strongly connected sub graphs (closed loops) contained in such a complicated lock graph.

Figure 2:
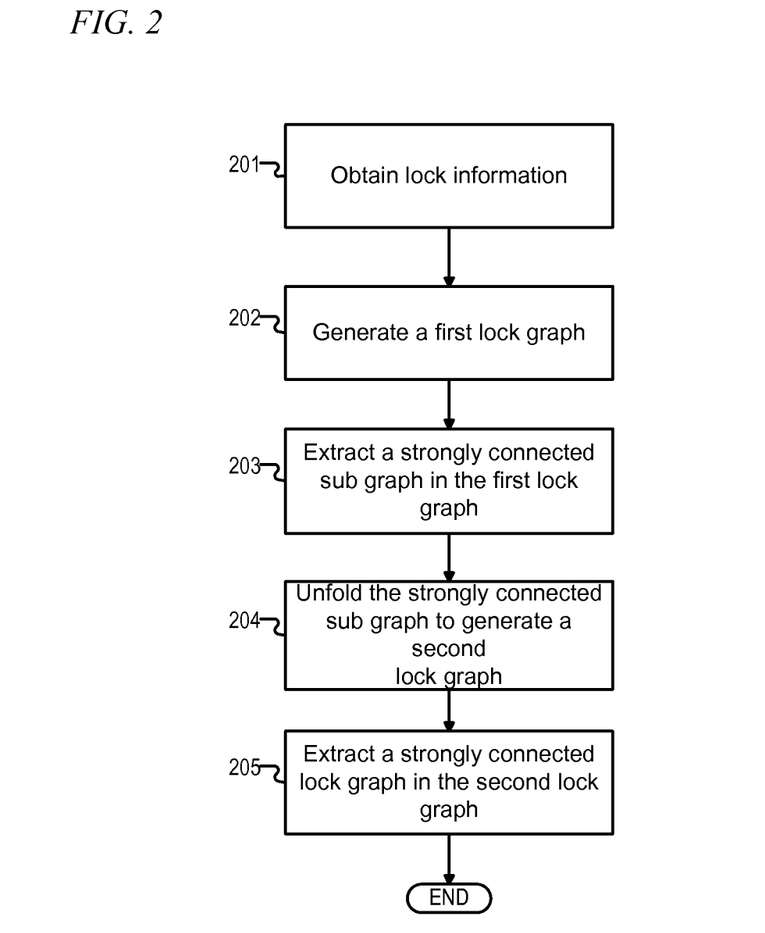
FIG. 2 illustrates a flow chart of a method for detecting deadlock according to an embodiment of the present invention.

FIG. 2 illustrates a flow chart of a method for detecting deadlock according to an embodiment of the present invention. The method as shown in FIG. 2 begins with step 201, where lock information relating to locking operation in a program is obtained. According to an embodiment of the present invention, the lock information comprises information on locking operation of a particular thread at a particular program location. Specifically, lock information may be in a form of the example recited in the literal depiction on FIG. 1: T1:12 (L1)15(L4), 7(L8)26(L3). The expression manner or recording manner of lock information is not unique, and the lock information may be specified in a plurality of expression manners. For example, the lock information may be specified without a particular thread (process) as the benchmark, but specified with a particular program location as the benchmark: 13(L1):T1,T8; 15(L4):T1,T7,T5. The meaning of this expression is: threads T1 and T8 are subjected to lock L1 in line 13 of the program code; and threads T1, T7, and T5 are subjected to lock L4 in line 15 of the program code. Additionally, the content possibly contained in the lock information is not merely limited to the information on locking operation of a particular thread at a particular program location. With respect to the source of lock information, according to an embodiment of the present invention, after the program runs, the locking information will be automatically recorded in an automatically generated log file, thereby obtaining locking information by reading the log file generated after the program runs.

Figure 4:
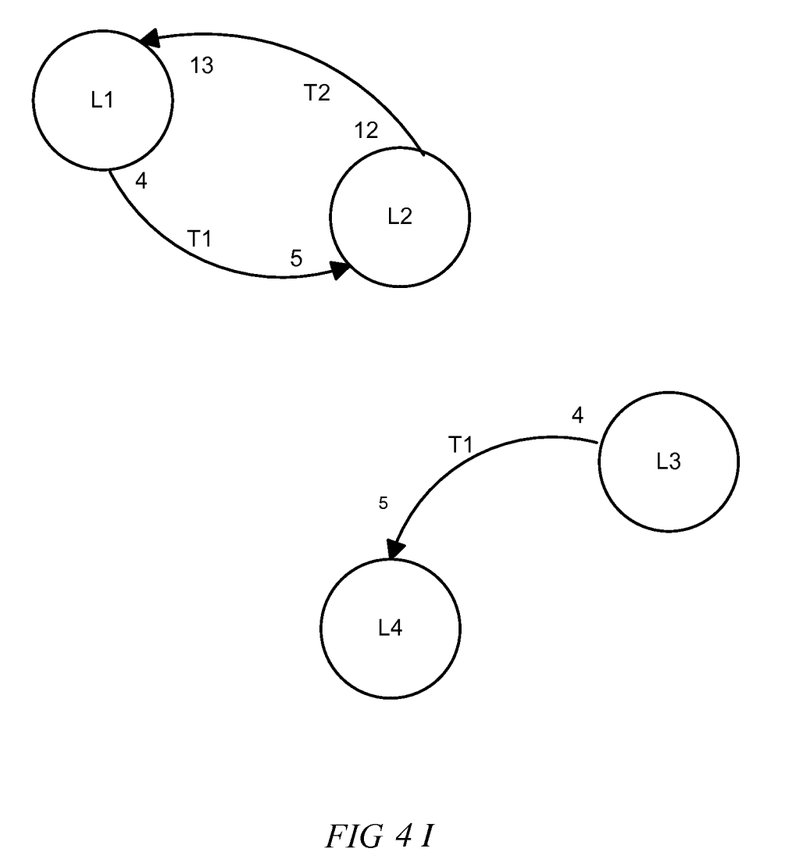

Next, the flow proceeds to step 202, where a first lock graph is generated based on the obtained lock information, wherein each node in the first lock graph comprises a set of locks comprising at least one lock and a set of program locations comprising at least one program location. Here, it should be noted that in the prior art, each node in a lock graph generated based on the lock information represents a lock, for example, L1 or L4 in the above example, while each node in the first lock graph as generated at step 202 comprises a set of locks and a set of programs. In other words, the meaning of a node in the first lock graph is different from the meaning of a node in a lock graph in the prior art. The reason why the node in the first lock graph comprises a set of locks and a set of program locations is to merge or combine a plurality of locks into one node to thereby reduce the number of nodes in the first lock graph. There may be a plurality of manners to implement this process of merging or combination. According to an embodiment of the present invention, the process of generating a node of the first lock graph may be based on the following two rules: (1) combining a plurality of particular program locations where the same lock is located on each thread into one node; and (2) combining all locks of respective threads at the same program location into one node. Using the above two rules, each node in the first lock graph comprises a set of locks comprising at least one lock and a set of program locations comprising at least one program location. For another simple example, suppose the obtained lock information is: (1) T1:12(L1)15(L4); (2) T5:12(L2)17(L4); and (3) T8:9(L1 )16(L3), then based on the above two rules, it may be determined that the set of program locations {9, 12} and the set of locks {L1, L2} are placed in the same node (suppose node A) of the first lock graph. The reason is: the program locations of each thread when subjected to lock L1 are 9 and 12, and thus based on rule (1), the program locations 9 and 12 are combined in node A to form a set of program locations for node A; meanwhile, the locks of each thread at the same program location 12 is L1 (for thread T1) and L2 (for thread T2), and thus based on rule (2), the locks L1 and L2 are also combined in node A to form a set of locks {L1, L 2} for node A. It should be noted that the reason for placing the set of locks {L1, L 2} and the set of program locations {9, 12} in the same node A is that based on the obtained lock information, there is a correlation between the locks in the set of locks and the program locations in the set of program locations, for example, T1:12(L1) and T8:9 (L1). Likewise, the set of program locations {17} and the set of locks {L4} will form node B, while the set of program locations {16} and the set of locks {L3} will form node C. It should be noted that the above example merely provides a possible embodiment of generating a node of the first lock graph. No matter what means to be taken by those skilled in the art, as long as the lock graph nodes are merged and simplified in some manner, they all fall within the protection scope of this invention. Hereinafter, a process of generating a node of the first lock graph based on the obtained lock information will be described in detail with reference to FIG. 4.

It should be emphasized that the same lock (for example, L1) involved in the obtained lock information can only be included in one node of the first lock graph, and likewise the same program location (for example, 12) involved in the obtained lock information can only be included in one node of the first lock graph. In other words, the lock and program location included in each node of the first lock graph cannot overlap, such that the subsequent step of unfolding a strongly connected sub graph in the first lock graph to generate a second lock graph may be performed correctly. Hereinafter, how to guarantee that the lock and program location included in each node of the first lock graph would not overlap will be depicted in detail according to an embodiment of the present invention with reference to FIG. 4.

It should be further noted that though introduced above is only the process of generating a node in the first lock graph without the process of generating a directed edge in the first lock graph, like a lock graph generated in the prior art, the directed edge in the first lock graph also denotes information on locking operation of a particular thread at a particular program location. The difference only lies in that since a node in the first lock graph may actually comprise a plurality of locks, theoretically there may actually exist a plurality of directed edges between two nodes of the first lock graph. Of course, it is unnecessary to embody the plurality of directed edges in the first lock graph, because as long as possible directed edges (directional relationship) between two nodes are embodied, the subsequent step of extracting a strongly connected sub graph may be implemented, without showing all overlapped directed edges. As to this point, detailed introduction will be made hereinafter with reference to a specific example of FIGS. 4A-4I.

Next at step 203, a strongly connected sub graph in the first lock graph is extracted. A strongly connected graph refers to a graph where between any two arbitrary nodes v1 and v2 in a directed graph, there is a path from v1 to v2 and a path from v2 to v1; the path here may include a direct path or an indirect path. A strongly connected graph may be simply understood as a loop graph or a closed loop graph. A strongly connected sub graph in a lock graph as utilized during a deadlock detection process indicates that a thread has competes on resources involved by two locks, thereby forming a loop. The reason for extracting a strongly connected sub graph in the first lock graph at step 203 is that only lock included in a node in a strongly connected sub graph in the first lock graph may cause deadlock after the strongly connected sub graph is unfolded (i.e., after generating a lock graph similar in the prior art with a node representing lock). For locks not present in a strongly connected sub graph in the first lock graph, it would be impossible for them to exist in any strongly connected sub graph even the whole first lock graph is completely unfolded, because there is no directed edge that causes these locks present in a strongly connected sub graph. As to how to extract or retrieve a strongly connected sub graph from a directed graph, it belongs to known technical means to those skilled in the art of graph theory. Meanwhile, in a graph theory based deadlock detection method in the prior art, this technical means may also be utilized to extract a strongly connected sub graph from a lock graph, which will not be detailed here.

At step 204, the strongly connected sub graph in the first lock graph is unfolded to generate a second lock graph, wherein each node in the second lock graph represents a single lock. It may be understood that step 204 is actually equivalent to the second phase as recited in the Summary of the Invention, while the generated second lock graph may also be understood to be similar to a unique lock graph directly generated by the graph theory based deadlock detection method in the prior art, because each node in the second lock graph represents a specific lock, while each directed edge in the second lock graph also denotes information on lock operation of a specific particular thread at a particular program location. Hereinafter, how to unfold a strongly connected sub graph in the first lock graph will be described. According to an embodiment of the present invention, based on the information on locking operation of a particular thread at a particular program location as recorded in the first lock graph, a second lock graph is generated by taking each lock in a set of locks included in each node in the strongly connected sub graph in the first lock graph as a new node. In other words, each lock included in the strongly connected sub graph is taken as a new node, wherein this node is a node in the second lock graph. As to the directed edge in the second lock graph, according to an embodiment of the present invention, the information on locking operation of a particular thread at a particular program location is recorded when generating the first lock graph, and thus during the process of generating the second lock graph by unfolding a strongly connected sub graph in the first lock graph, such recorded information may be directly and selectively read out to generate a directed edge in the second lock graph. According to another embodiment of the present invention, when generating the first lock graph, not all information on locking operation of a particular thread at a particular program location may be recorded, while upon generating a second lock graph by unfolding a strongly connected sub graph in the first lock graph, the information on locking operation of a particular thread at a particular program location as recorded in a log file generated after running of the program is read again (selectively) to generate a directed edge in the second lock graph. As to this point, detailed description will be likewise made hereinafter with reference to the specific example of FIGS. 4A-4I.

Next, at step 205, a strongly connected sub graph in the second lock graph is extracted, the strongly connected sub graph in the second lock graph indicating deadlock in the program. The step of extracting a strongly connected sub graph in the second lock graph at step 205 is similar to the step of extracting a strongly connected sub graph in the first lock graph at step 203, and also similar to the means of extracting a strongly connected sub graph in the lock graph in the prior art graph theory based deadlock detection method, which will not be detailed here.

It can be seen from the above content that by using a method for detecting deadlock according to an embodiment of the present invention, since a plurality of locks may be combined into one node, quantity of nodes and directed edged in the generated lock graph may be saved, and further time and system resources consumed in detecting a strongly connected sub graph (closed loop) in a lock graph may be saved, which may achieve a technical effect of improving deadlock detection speed and efficiency and saving system operation resources and time consumption.

Figure 3:
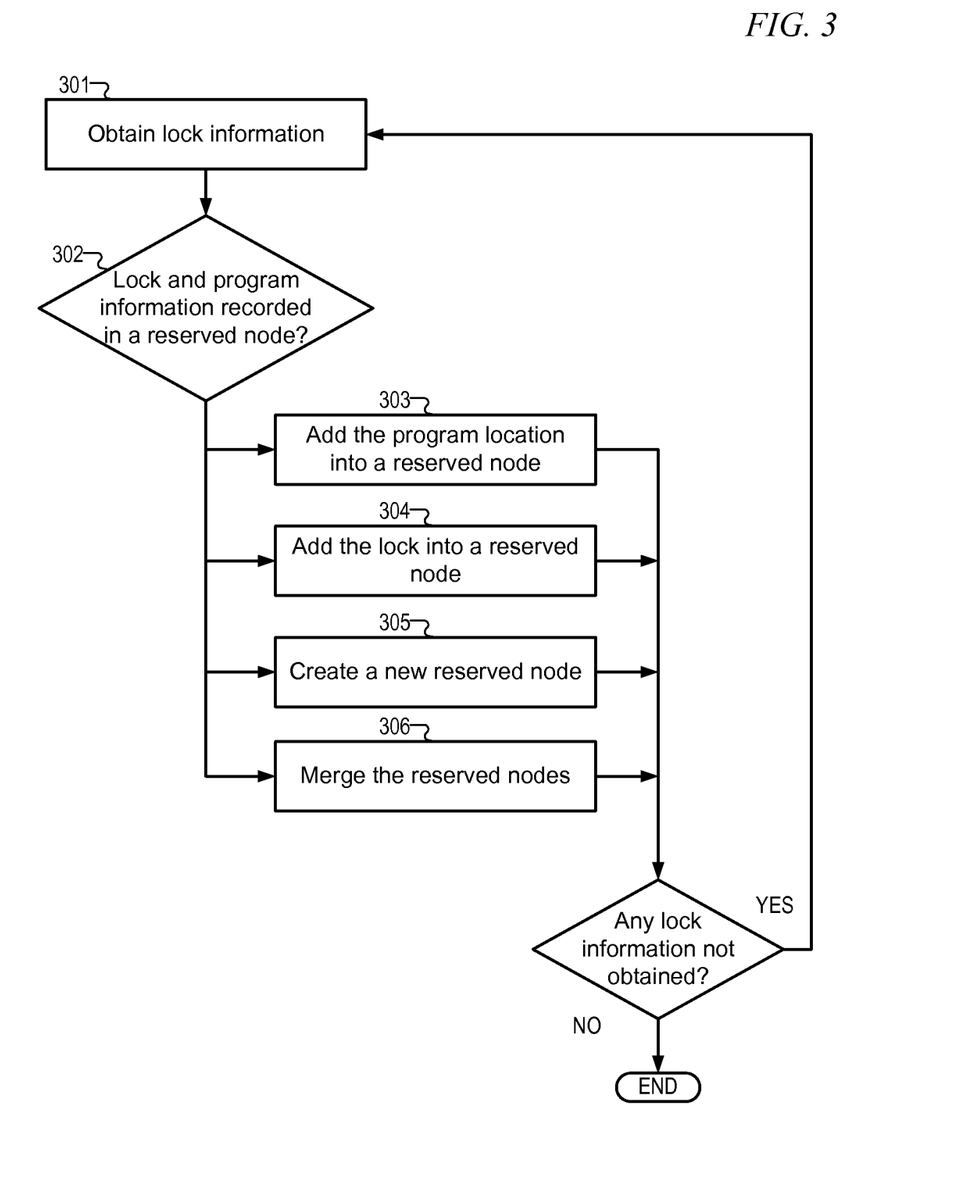
FIG. 3 illustrates a flow chart of a method for generating a first lock graph according to an embodiment of the present invention.

FIG. 3 illustrates a flow chart of a method for detecting deadlock according to another embodiment of the present invention. Specifically, FIG. 3 illustrates a flow chart of a method for generating a first lock graph according to an embodiment of the present invention. The method as illustrated in FIG. 3 may be understood as further refining steps 201202 in FIG. 2. The method as illustrated in FIG. 3 begins with step 301, where lock information in a program is obtained. Step 301 is similar to step 201 in FIG. 2, which will not be detailed here.

At step 302, it is determined whether a lock indicated by information on locking operation in the obtained lock information and program location information corresponding to the information on locking operation have been recorded in a reserved node in the first lock graph. The "reserved node" here is to embody that during the process of generating a first lock graph, the node is not generated once for all, but in a constantly updating process. Any node generated during the process before generating (or determining) a final node of the first lock graph may be called a "reserved node" of the first lock graph. One reason for performing the above determination at step 302 is to guarantee that each lock and each program location are only saved once in a node of the first lock graph, and will not repetitively appear in different nodes of the first lock graph. There may be four determining results of step 302, for which four determining results, steps 303 306 are performed, respectively. Hereinafter, the four determining results and corresponding subsequent steps will be introduced.

Determining result 1: if the lock indicated by the information on locking operation has been recorded in a reserved node of the first lock graph, while the program location information is not recorded in a reserved node of the first lock graph, then step 303 is performed to record the program location information in a reserved node comprising the lock in the first lock graph. It actually embodies one of the two rules as introduced above: combining a plurality of particular program locations on respective threads where the same lock is located into one node.

Determining result 2: if the program location information has been recorded in a reserved node of the first lock graph, while the lock indicated by the information on locking operation is not recorded in a reserved node of the first lock graph, then step 304 is performed to record the lock in a reserved node comprising the program location information in the first lock graph. It actually also embodies one of the two rules as introduced above: combining all locks of respective threads at the same program location into one node.

Determining result 3: if neither of the lock indicated by the information on locking operation and the program location information corresponding to the information on locking operation is recorded in a reserved node of the first lock graph, then step 305 is performed, where the lock and the program location information are recorded in the same new reserved node of the first lock graph.

Determining result 4: if both of the lock indicated by the information on locking operation and the program location information corresponding to the information on locking operation have been recorded in reserved nodes of the first lock graph, and the node recording the lock and the reserved node recording the program location information are different reserved nodes, then step 306 is performed to merge the different reserved nodes into one reserved node. An example of this determining result is cited as follows: suppose the obtained lock information is T1:5(L2)6(L1), then based on the above determining result 3 and step 305, a reserved node A: {5}, {L2} is first formed with 12 (L1). Then still based on the above determining result 3 and step 305, a reserved node B: {6}, {L1} is formed with 6 (L1). Next, suppose further obtaining lock information T2:5(L1)7(L3), then based on the determining result 4, the program location 5 and lock L1 have been both recorded in different reserved nodes of the first lock graph, then step 306 is performed to merge the different reserved nodes, i.e., merging reserved nodes A and B into one reserved node A': {5, 6}, {L1, L2}. One of the objectives for such action is to guarantee that each lock and each program location are only saved once in a node of the first lock graph, and will not repetitively appear in different nodes of the first lock graph.

After performing steps 303 to 306 based on the above four determining results, respectively, the process unanimously proceeds to step 307. At step 307, it is determined whether there exists further lock information that has not been obtained yet; if yes, then return to step 301 to continuously perform the step of obtaining lock information and the subsequent determining step 302 to continue the process of updating reserved nodes of the first lock graph. If no, then it indicates that all lock information has been obtained, thus the previously generated reserved nodes become official nodes of the first lock graph, and therefore the method of FIG. 3 ends.

Step 307 guarantees that generation of the first lock graph is completely based on all and full lock information, for example, recorded in a log file of the program, which misses no lock information and therefore guarantees accuracy and integrity of deadlock detection.

It should be noted that in fact, for the determination of step 302, besides the above four determining results, there is a further fifth determining result theoretically. That is, both of the lock indicated by the information on locking operation and the program location information corresponding to the information on locking operation have been recorded in reserved nodes of the first lock graph, and the node recording the lock and the reserved node recording the program location information are the same reserved node. For this determining result, the skilled in the art may fully understand that it would be unnecessary to perform any operation of updating a reserved node of the first lock graph. The reason why this determining result is not shown in FIG. 3 is just that no operation is required under this determining result and next lock information is just directly obtained.

FIGS. 4A to 4I illustrate exemplary diagrams of performing deadlock detection according to an embodiment of the present invention. Specifically, FIGS. 4A to 4I illustrate a detailed process of generating a first lock graph at step 202, or FIGS. 4A to 4I illustrate examples of generating a first lock graph according to each step of the method of FIG. 3.

Figure 4A:
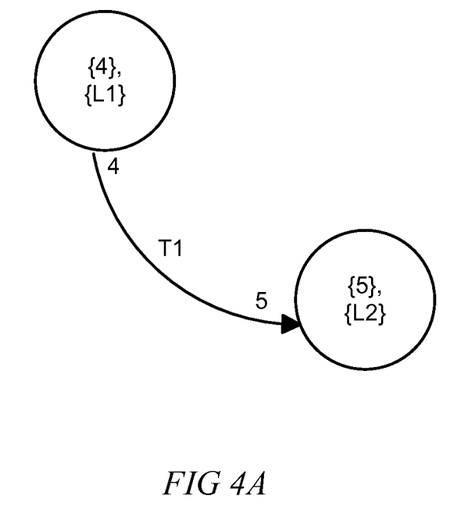

Still taking the example adopted in depicting FIG. 1, suppose the 9 pieces of lock information are (1)T1:4L15L2; (2)T3:16L217L5; (3)T1:4L35L4; (4)T3:16L218L8; (5)T3: 16L217L7; (6)T3:17L718L8; (7)T3:17L518L6; (8)T2: 12L213L1; and (9)T3:16L218L6, respectively. Now, at step 301, the first piece of lock information T1:4L15L2 is obtained, and next at step 302, it is determined whether a lock indicated by information on locking operation in the obtained lock information and program location information corresponding to the information on locking operation have been recorded in a reserved node in the first lock graph. Apparently, the determining result is that neither has been recorded in a reserved node. Then step 305 is performed to record the lock and the program location information in the same new reserved node of the first lock graph, thereby generating two new reserved nodes. Meanwhile, a directed edge for these two reserved nodes may be generated based on the first piece of lock information, where the directed edge may be marked with locking information of the particular thread at the particular program location (similar to the directed edge in the prior art lock graph of FIG. 1). The two reserved nodes and the directed edge generated after performing step 305 are shown in FIG. 4A. It should be noted that upon performing determination at step 302, it is necessary to perform determination on each group of program location and lock in the lock information. For example, in the first piece of lock information, there are two groups of program location lock pair, namely, 4L1, 5L2, but determination on the 4L1 and 5L2 cannot be mixed.

Figure 4B:
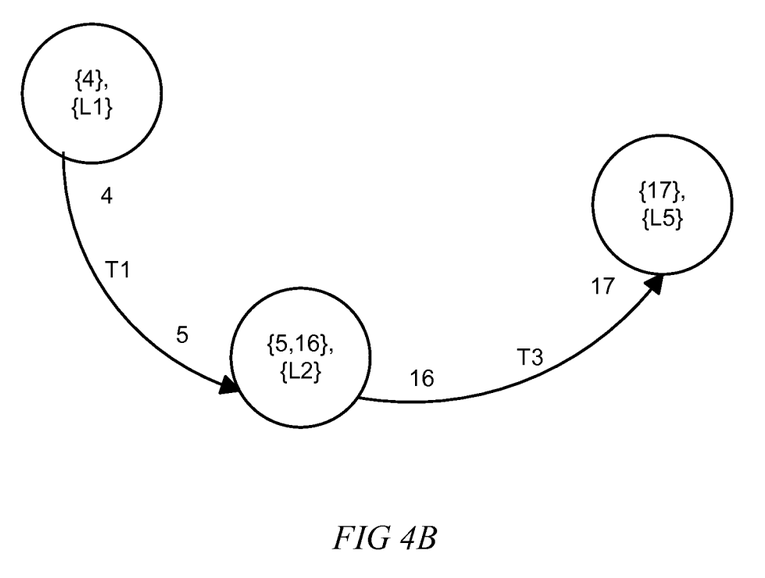

Next, determining step 307 is performed; if the determination result is that there still exists lock information that has not been obtained yet, and thus the process returns to step 301 to continue obtaining the second piece of lock information T3:16L217L5. Next at step 302, it is determined that for 16L2, since L2 already exists in a reserved node generated in FIG. 4A, step 303 is performed to record the program location information in the reserved node comprising the lock in the first lock graph. As to 17L5, neither of the program location and the lock has been recorded in a reserved node, and thus step 305 is performed to record the lock and the program location information in the same new reserved node of the first lock graph to thereby generate a new reserved node. Generation of a directed edge is as above depicted. An updated first lock graph for the second piece of lock information is illustrated in FIG. 4B.

Figure 4C:
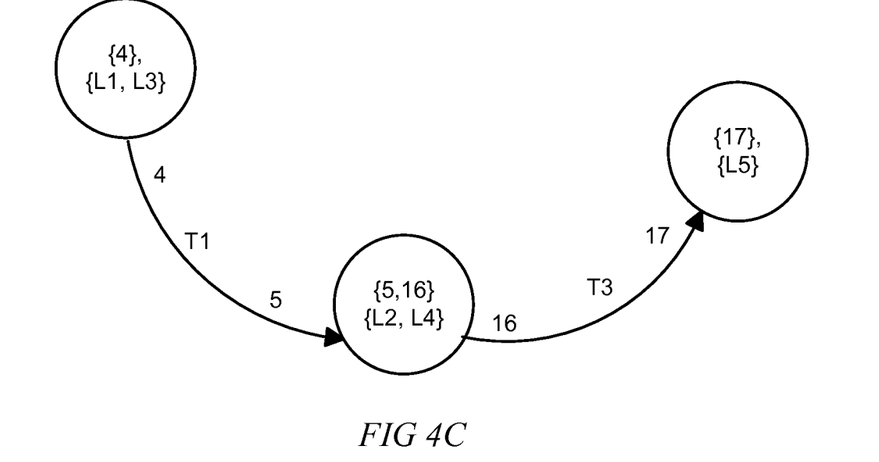
Figure 4D:
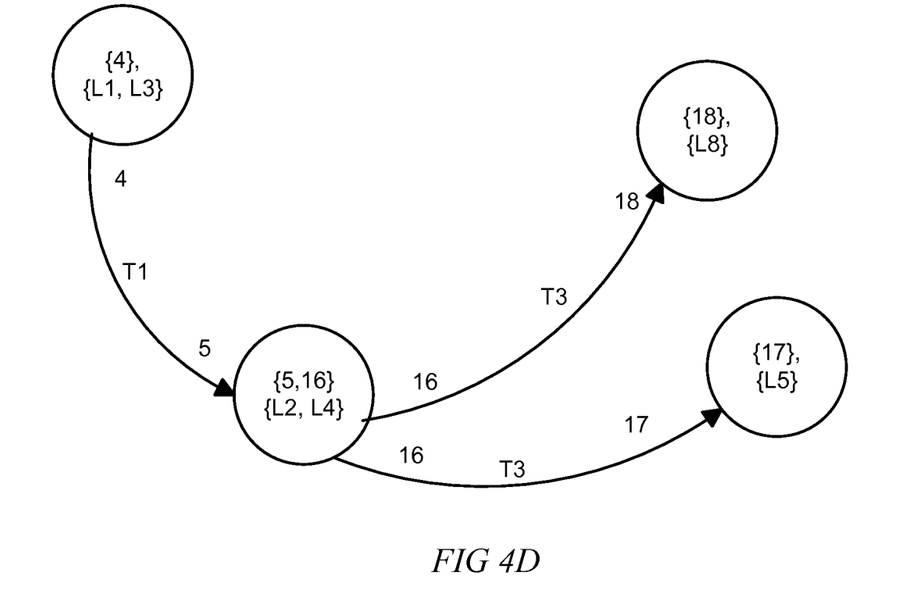
Figure 4E:
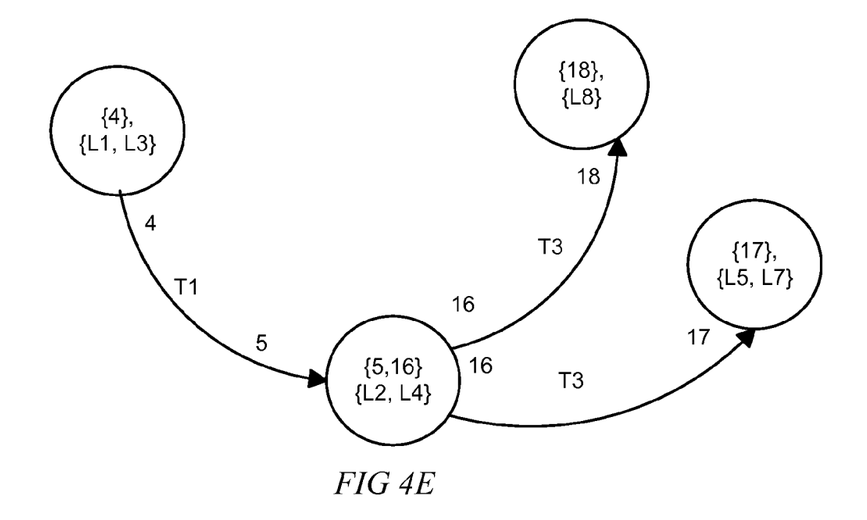
Figure 4F:
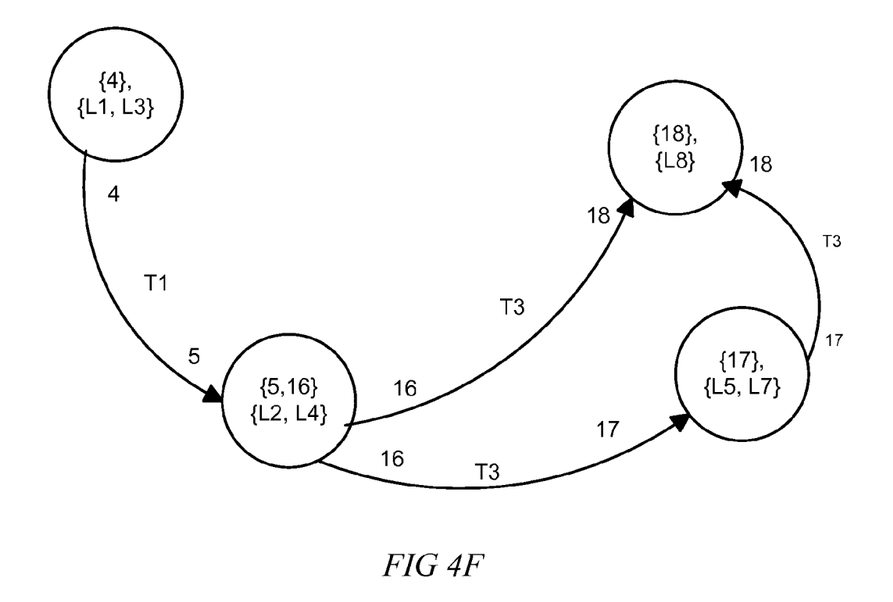
Figure 4G:
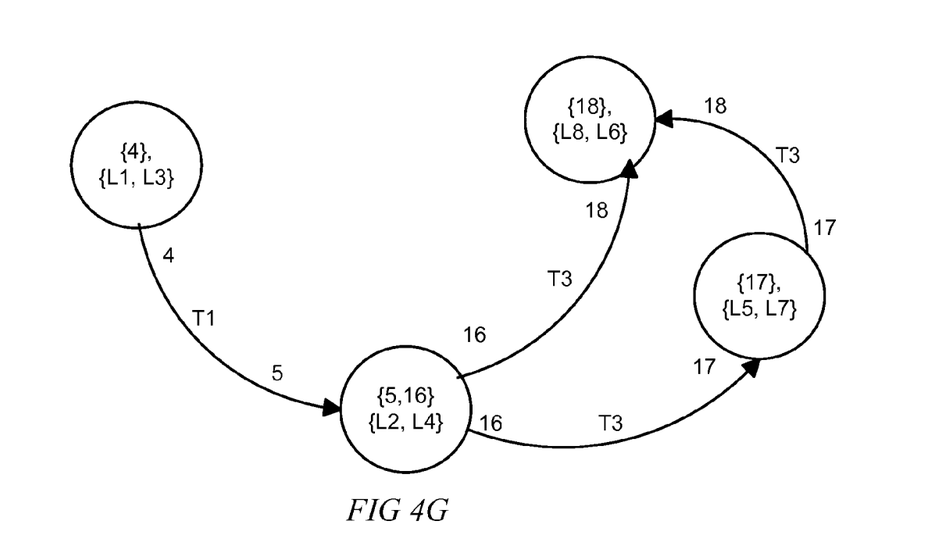

Next, determining step 307 is performed; if the determination result is that there still exists lock information that has not been obtained yet, and thus the process returns to step 301 to continue obtaining the third piece of lock information T1:4L35L4. Next at step 302, it is determined that for 4L3, since the program location 4 already exists in a reserved node generated in FIG. 4B, step 304 is performed to record the lock L3 in the reserved node comprising the program location in the first lock graph. For 5L4, since the program location 5 already exists in a reserved node generated in FIG. 4B, step 304 is performed to record the lock L4 in the reserved node comprising the program location in the first lock graph. An updated first lock graph for the third piece of lock information is illustrated in FIG. 4C.

Likewise, for the fourth, fifth, sixth, seventh, and eighth pieces of lock information, the updated first lock graphs are illustrated in FIGS. 4D to 4H, respectively, where it should be noted that the first lock graph 4F updated for the sixth piece of lock information has no change on the reserved nodes compared with the first lock graph 4E updated for the fifth piece of lock information, except for adding a directed edge.

Figure 4H:
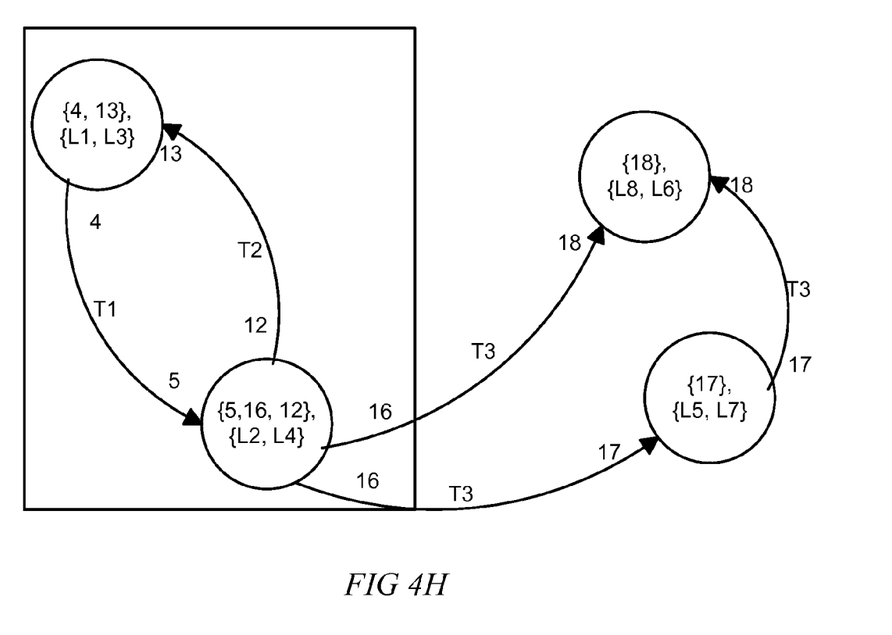

Finally, it is determined after obtaining the ninth piece of lock information T3:16L218L6 that for 16L2, the program location and the lock have already been recorded on a reserved node. For 18L6, the program location and the lock have also been recorded in a reserved node, and the ninth piece of information does not cause addition of any directed edge. Thus, for the ninth piece of lock information, no update will occur to FIG. 4H. Next, at step 307, it is determined that all lock information has been obtained, and thus the first lock graph as finally generated is as illustrated in FIG. 4H. Accordingly, there are only 4 nodes in the first lock graph, which is only half the number of nodes in the lock graph as generated according to the method of FIG. 1, and meanwhile, there are only 5 directed edges in the first lock graph, which is also less than the number of 8 directed edges in the lock graph as illustrated in FIG. 1.

Next, at step 203, a strongly connected sub graph in the first lock graph is extracted, wherein the extracted strongly connected sub graph is shown by the frame in FIG. 4H. The method of extracting a strongly connected sub graph belongs to known technical means of those skilled in the art of graph theory, which will not be detailed here.

Next, at step 204, the extracted strongly connected sub graph is unfolded to generate a second lock graph. About how to unfold the strongly connected sub graph into a second lock graph, it has been introduced in detail in the above literal depiction on FIG. 2. As to the strongly connected sub graph illustrated in FIG. 4H, the locks therein are only L1, L2, L3, and L4, and thus the second lock graph generated by unfolding this strongly connected sub graph also only has 4 nodes. The generated second lock graph is shown in FIG. 4I. It should be noted that besides conveniently determining nodes in the second lock graph, directed edges in the second lock graph may be generated from information on locking operation (information about the locked lock) of a particular thread at a particular program location as recorded in the first lock graph, or according to another embodiment of the present invention, directed edges may be generated through querying again lock information in the log file of the program.

Further at step 205, a strongly connected sub graph in the second lock graph as shown in FIG. 4I is extracted, from which it can be seen that nodes L1 and L2 construct a closed loop to thereby detect deadlock information. The deadlock information detected through this method is consistent with the detection result according to the method of FIG. 1, and thus the correctness will not be affected. Meanwhile, since the number of nodes and the number of directed edges are reduced in the first lock graph, complexity for detecting a loop (strongly connected sub graph) in a lock graph is greatly saved, thereby realizing a technical effect of saving time and resources.

Figure 5:
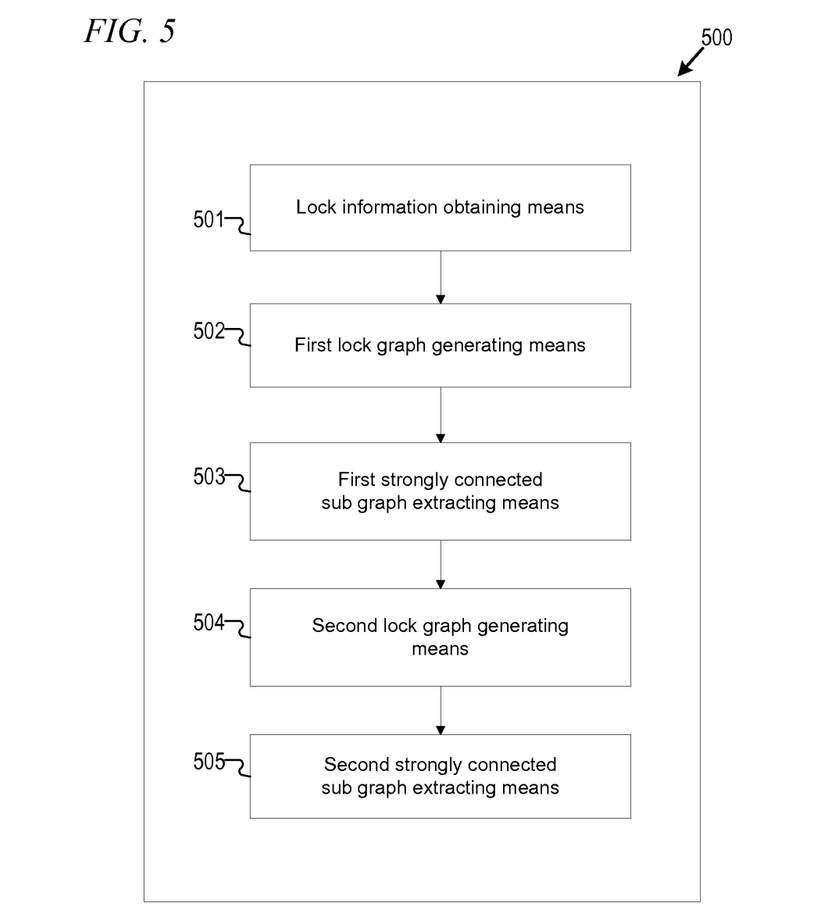
FIG. 5 illustrates a structural diagram of a system for detecting deadlock according to an embodiment of the present invention.

FIG. 5 illustrates a structural diagram of a system for detecting deadlock according to an embodiment of the present invention. The system as illustrated in FIG. 5 is generally indicated by 500. Specifically, the system 500 comprises lock information obtaining means 501, first lock graph generating means 502, first strongly connected sub graph extracting means 503, second lock graph generating means 504, and second strongly connected sub graph extracting means 505. The lock information obtaining means 501 is for obtaining lock information in a program. The first lock graph generating means 502 is for generating a first lock graph based on the obtained lock information, wherein each node in the first lock graph comprises a set of locks comprising at least one lock and a set of program locations comprising at least one program location. The first strongly connected sub graph extracting means 503 is for extracting a strongly connected sub graph in the first lock graph. The second lock graph generating means 504 is for unfolding the strongly connected sub graph in the first lock graph to generate a second lock graph, wherein each node in the second lock graph represents a single lock. The second strongly connected sub graph extracting means 505 is for extracting a strongly connected sub graph in the second lock graph, wherein the strongly connected sub graph in the second lock graph indicates deadlock in the program. The skilled in the art may understand that, the system 500 generally corresponds to the method of FIG. 2, and specifically means 501 505 in the system 500 correspond to steps 201 to 205 of the method as illustrated in FIG. 2, respectively.

Figure 6:
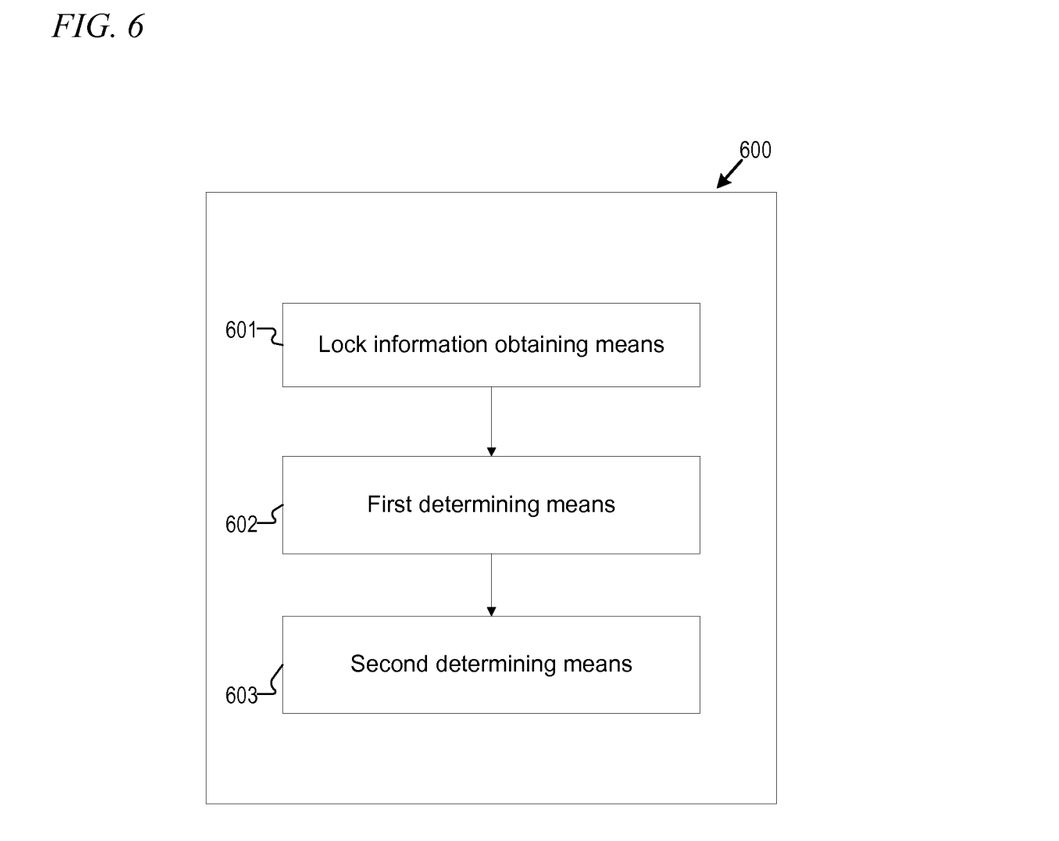
FIG. 6 illustrates a structural diagram of a system for generating a first lock graph according to an embodiment of the present invention.

FIG. 6 illustrates a structural diagram of a system for detecting deadlock according to an embodiment of the present invention. The system as illustrated in FIG. 6 is generally indicated by 600. Specifically, the system 600 comprises lock information obtaining means 601, first determining means 602, and second determining means 603.

The lock information obtaining means 601 is for obtaining lock information in a program.

The first determining means 602 is for determining whether a lock indicated by information on locking operation in the obtained lock information and program location information corresponding to the information on locking operation have been recorded in a reserved node of the first lock graph. The first determining means 602 is further configured to: if the lock indicated by the information on locking operation has been recorded in a reserved node of the first lock graph, while the program location information is not recorded in a reserved node of the first lock graph, then record the program location information in the reserved node comprising the lock in the first lock graph; if the program location information has been recorded in a reserved node of the first lock graph, while the lock indicated by the information on locking operation is not recorded in a reserved node of the first lock graph, then record the lock in the reserved node comprising the program location information in the first lock graph; if neither of the lock indicated by the information on locking operation and the program location information corresponding to the information on locking operation is recorded in a reserved node of the first lock graph, then record the lock and the program location information in the same new reserved node of the first lock graph; and if both of the lock indicated by the information on locking operation and the program location information corresponding to the information on locking operation have been recorded in reserved nodes of the first lock graph and the node recording the lock and the reserved node recording the program location information are different reserved nodes, then merge the different reserved nodes into one reserved node.

The second determining means 603 is for determining whether there exists lock information that has not been obtained yet, and the second determining means 603 is further configured to: if the determining result is yes, then continue obtaining the lock information by the lock information obtaining means 601; and if the determining result is no, then take the reserved nodes as nodes of the first lock graph.

The skilled in the art may understand that the system 600 generally corresponds to the method of FIG. 3, and specifically means 601 of the system 600 corresponds to step 301 of the method of FIG. 3, means 602 of the system 600 corresponds to steps 302 to 306 of the method of FIG. 3, and means 603 of the system 600 corresponds to step 307 of the method of FIG. 3.

Through the above description on preferred embodiments, those skilled in the art may understand that the above system, apparatus and method may be implemented with computer executable instructions and/or in processor control code, for example, stored on magnetic disk, CD, or DVDROM, or a programmable memory such as read only memory (firmware). The apparatus, server and components thereof in the present embodiment may be implemented by hardware circuitry such as a very large scale integrated circuit or gate array, a semiconductor such as logical chip or transistor, or a programmable hardware device such as a field programmable gate array or a programmable logical device, or implemented by processor control code executed by various kinds of processors, or implemented by combination of the above hardware circuitry and storage.

Though the system and method for processing a local document with remote application has been described in detail with reference to preferred embodiments, the present invention is not limited thereto. A person of normal skill in the art can make various changes, alterations and modifications to the present invention under the teaching of the description without departing from the spirit and scope of the present invention. It should be understood that all such changes, alterations, and modifications still fall within the protection scope of the present invention. The protection scope of the present invention is defined by the appended claims.

What is claimed is:

1. A method for detecting program deadlock, comprising the steps of:

obtaining lock information related to locking operation in a program to form obtained lock information;

generating a first lock graph based on the obtained lock information, wherein each node in the first lock graph comprises a set of locks comprising at least one lock and a set of program locations comprising at least one program location, wherein the generating the first lock graph further comprises:

determining whether a lock indicated by the obtained information on locking operation of at least one particular thread at a first program location and a program location corresponding to the lock has been recorded in a reserved node of the first lock graph;

in response to the lock indicated by the information on locking operation being recorded in the reserved node without a second program location, recording the second program location together with at least the second program location in the reserved node; and in response to the first program location being recorded in the reserved node without the lock indicated by the information on locking operation, recording the lock indicated by the information on locking operation together with at least the first program location in the reserved node;

extracting a strongly connected sub graph in the first lock graph;

unfolding the strongly connected sub graph in the first lock graph to generate a second lock graph, wherein each node in the second lock graph comprises a single lock; and extracting a strongly connected sub graph in the second lock graph, the strongly connected sub graph in the second lock graph indicating a deadlock in the program, wherein the first lock graph and the second lock graph comprise directed edges, which indicate locking operation of the at least one particular thread at at least the first program location.

2. A method for detecting program deadlock, comprising the steps of:

obtaining lock information related to locking operation in a program to form obtained lock information;

generating a first lock graph based on the obtained lock information, wherein each node in the first lock graph comprises a set of locks comprising at least one lock and a set of program locations comprising at least one program location, wherein the generating the first lock graph further comprises:

recording in the first lock graph the obtained information on locking operation of the at least one particular thread at the first program location;

determining whether a lock indicated by the obtained information on locking operation of at least one particular thread at a first program location and a program location corresponding to the lock has been recorded in a reserved node of the first lock graph;

in response to the lock indicated by the information on locking operation being recorded in the reserved node without a second program location, recording the second program location together with at least the second program location in the reserved node; and in response to the first program location being recorded in the reserved node without the lock indicated by the information on locking operation, recording the lock indicated by the information on locking operation together with at least the first program location in the reserved node;

extracting a strongly connected sub graph in the first lock graph;

unfolding the strongly connected sub graph in the first lock graph to generate a second lock graph, wherein each node in the second lock graph comprises a single lock; and extracting a strongly connected subgraph in the second lock graph, the strongly connected sub graph in the second lock graph indicating a deadlock in the program.

3. The method of claim 2, wherein the step of unfolding the strongly connected sub graph in the first lock graph to generate the second lock graph comprises:

based on the information on locking operation of the at least one particular thread at the first program location as recorded in the first lock graph, taking each lock in a set of locks included in each node of the strongly connected sub graph in the first lock graph as a new node to generate the second lock graph.

4. A method for detecting program deadlock, comprising the steps of:

obtaining lock information related to locking operation in a program to form obtained lock information;

generating a first lock graph based on the obtained lock information, wherein each node in the first lock graph comprises a set of locks comprising at least one lock and a set of program locations comprising at least one program location, wherein the first program location is a line serial number of program code, and wherein the generating the first lock graph further comprises:

determining whether a lock indicated by the obtained information on locking operation of at least one particular thread at a first program location and a program location corresponding to the lock has been recorded in a reserved node of the first lock graph;

in response to the lock indicated by the information on locking operation being recorded in the reserved node without a second program location, recording the second program location together with at least the second program location in the reserved node; and in response to the first program location being recorded in the reserved node without the lock indicated b the information on locking operation, recording the lock indicated by the information on locking operation together with at least the first program location in the reserved node;

extracting a strongly connected sub graph in the first lock graph;

unfolding the strongly connected sub graph in the first lock graph to generate a second lock graph, wherein each node in the second lock graph comprises a single lock; and extracting a strongly connected sub graph in the second lock graph, the strongly connected sub graph in the second lock graph indicating a deadlock in the program.

5. A system for detecting program deadlock, comprising:

lock information obtaining means for obtaining lock information related to locking operation in a program;

first lock graph generating means for generating a first lock graph based on the obtained lock information, wherein each node in the first lock graph comprises a set of locks comprising at least one lock and a set of program locations comprising at least one program location, wherein the first lock graph generating means further comprises:

determining means for determining whether a lock indicated by the obtained information on locking operation of at least one particular thread at a first program location and a program location corresponding to the lock have been recorded in a reserved node of the first lock graph;

first recording means for recording the second program location together with at least the second program location in the reserved node, in response to the lock indicated by the information on locking operation being recorded in the reserved node without a second program location; and second recording means recording the lock indicated by the information on locking operation together with at least the first program location in the reserved node, in response to the first program location being recorded in the reserved node without the lock indicated by the information on locking operation;

first strongly connected sub graph extracting means for extracting a strongly connected sub graph in the first lock graph;

second lock graph generating means for unfolding the strongly connected sub graph in the first lock graph to generate a second lock graph, wherein each node in the second lock graph represents a single lock; and second strongly connected sub graph extracting means for extracting a strongly connected sub graph in the second lock graph, the strongly connected sub graph in the second lock graph indicating deadlock in the program.

6. The system of claim 5, wherein the first lock graph and the second lock graph comprise directed edges, which indicate locking operation of the at least one particular thread at the first program location.

7. The system of claim 5, wherein the first lock graph generating means is further configured to: record in the first lock graph the obtained information on locking operation of all particular threads at particular program locations.

8. The system of claim 7, wherein the second lock graph generating means is further configured to: based on the information on locking operation of all particular threads at particular program locations as recorded in the first lock graph, taking each lock in a set of locks included in each node of the strongly connected sub graph in the first lock graph as a new node to generate the second lock graph.

9. The system of claim 5, wherein the first program location is a line serial number of program code.

* * * * *